United States Patent
da Silva et al.

(10) Patent No.: US 10,484,916 B2
(45) Date of Patent: *Nov. 19, 2019

(54) NETWORK NODES AND METHODS THEREIN FOR HANDLING COMMUNICATIONS IN A RADIO COMMUNICATIONS NETWORK

(71) Applicant: Telefonaktiebolaget LM Ericsson (publ), Stockholm (SE)

(72) Inventors: Icaro L. J. da Silva, Bromma (SE); Angelo Centonza, Winchester (GB)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/896,829

(22) Filed: Feb. 14, 2018

(65) Prior Publication Data

US 2018/0176836 A1 Jun. 21, 2018

Related U.S. Application Data

(63) Continuation of application No. 15/367,421, filed on Dec. 2, 2016, now Pat. No. 9,900,812, which is a (Continued)

(51) Int. Cl.
*H04W 76/18* (2018.01)
*H04W 36/00* (2009.01)
(Continued)

(52) U.S. Cl.
CPC ..... *H04W 36/0083* (2013.01); *H04L 41/0668* (2013.01); *H04W 24/10* (2013.01); *H04W 76/18* (2018.02); *H04W 76/19* (2018.02)

(58) Field of Classification Search
None
See application file for complete search history.

(56) References Cited

U.S. PATENT DOCUMENTS 9,544,938 B2 * 1/2017 da Silva .............. H04L 41/0668
9,900,812 B2 * 2/2018 da Silva .............. H04W 76/18
(Continued)

FOREIGN PATENT DOCUMENTS

CN 101400088 A 4/2009
CN 102905291 A 1/2013
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)",3GPP TS 36.300 V10.11.0, Sep. 2013, 1-195.
(Continued)

*Primary Examiner* — Brian S Roberts
(74) *Attorney, Agent, or Firm* — Murphy, Bilak & Homiller, PLLC

(57) ABSTRACT

A method performed by a network node for handling communications in a radio communications network is provided. The network node is configured to be in the radio communications network. The network node receives a report of a radio link failure (RLF) of a user equipment (UE), which report comprises an identity of a re-establishment cell, configures an RLF indication comprising the received report to further comprise a first indication of the cell identity of the current cell the UE is connected and/or a second indication of a result of a comparison between the cell identity of the cell the UE was connected to upon sending the RLF report and the identity of the re-establishment cell, and sends the RLF indication to another network node. A network node for handling communications in a radio communications network is also provided.

15 Claims, 8 Drawing Sheets

Related U.S. Application Data continuation of application No. 14/417,308, filed as application No. PCT/SE2014/051504 on Dec. 15, 2014, now Pat. No. 9,544,938.

(60) Provisional application No. 61/929,546, filed on Jan. 21, 2014.

(51) Int. Cl.
*H04W 76/19* (2018.01)
*H04L 12/24* (2006.01)
*H04W 24/10* (2009.01)

(56) References Cited

U.S. PATENT DOCUMENTS

| | | | | |
|---|---|---|---|---|
| 2010/0173626 | A1* | 7/2010 | Catovic | H04W 24/02 455/423 |
| 2010/0234027 | A1 | 9/2010 | Han et al. | |
| 2012/0069732 | A1* | 3/2012 | Xu | H04W 76/18 370/221 |
| 2012/0250498 | A1* | 10/2012 | Johansson | H04L 41/0604 370/221 |
| 2013/0316713 | A1* | 11/2013 | Xu | H04W 36/32 455/438 |
| 2014/0050197 | A1* | 2/2014 | Legg | H04W 6/19 370/331 |
| 2014/0133465 | A1* | 5/2014 | Johansson | H04W 24/04 370/332 |

FOREIGN PATENT DOCUMENTS

| | | |
|---|---|---|
| CN | 103179601 A | 6/2013 |
| CN | 103250448 A | 8/2013 |
| CN | 103460750 A | 12/2013 |
| CN | 103517322 A | 1/2014 |
| CN | 103797846 A | 5/2014 |
| TW | 201208408 A | 2/2012 |
| WO | 2013115532 A1 | 8/2013 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)",3GPP TS 36.300 V12.0.0, Dec. 2013, 1-208.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 1-347.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, 1-344.

3GPP, "3rd Generation Partnership Project; Technical Specification Group Radio Access Network; Study on next generation Self-Optimizing Network (SON) for UTRAN and E-UTRAN; (Release 12)", 3GPP TR 37.822 V1.0.1, Sep. 2013, 1-12.

3GPP, "3rd Generation Partnership Project; Technical Specification Group Radio Access Network; Study on next generation Self-Optimizing Network (SON) for UTRAN and E-UTRAN; (Release 12)", 3GPP TR 37.822 V1.4.0, Apr. 2014, 1-20.

3GPP, "3rd Generation Partnership Project; Technical Specification Group Services and System Aspects; Telecommunication management; Performance Management (PM); Performance measurements Evolved Universal Terrestrial Radio Access Network (E-UTRAN) (Release 12)", 3GPP TS 32.425 V12.0.0, Jun. 2013, 1-74.

Unknown, Author, "3GPP TS 36.423 V12.0.0", 3rd Generation Partnership Project; Technical Specification Group Radio Access Network; Evolved Universal Terrestrial Radio Access Network (E-UTRAN); X2 application protocol (X2AP) (Release 12), Dec. 2013, pp. 1-143.

Unknown, Author, "Analysis on the scenario of RRC Re-establishment failure", CATT, Fujitsu, Huawei, CMCC, ITRI, 3GPP TSG RAN WG3 Meeting #81bis, R3-131702, Venice, Italy, Oct. 7-11, 2013, 1-4.

Unknown, Author, "Impact on MRO from RRC re-establishment", Huawei, Fujitsu, CATT, 3GPP TSG-RAN WG3 Meeting #81, R3-131285, Barcelona, Spain, Aug. 19-23, 2013, 1-8.

Unknown, Author, "Solution proposal for the Impact on MRO from RRC re-establishment", Ericsson, 3GPP TSG.RAN WG3 Meeting #83, R3.140417, Prague, Checz Republique, Feb. 10-14, 2014, 1-2.

Unknown, Author, "Solution proposal for the Impact on MRO from RRC re-establishment", Ericsson, 3GPP TSG-RAN WG3 Meeting #83, R3-140320, Prague, Checz Republique, Feb. 10-14, 2014, 1-8.

* cited by examiner

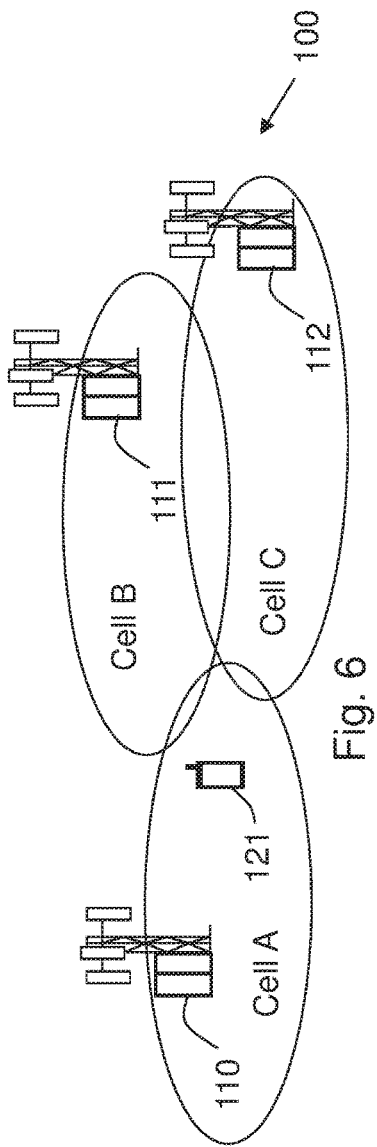
Fig. 6
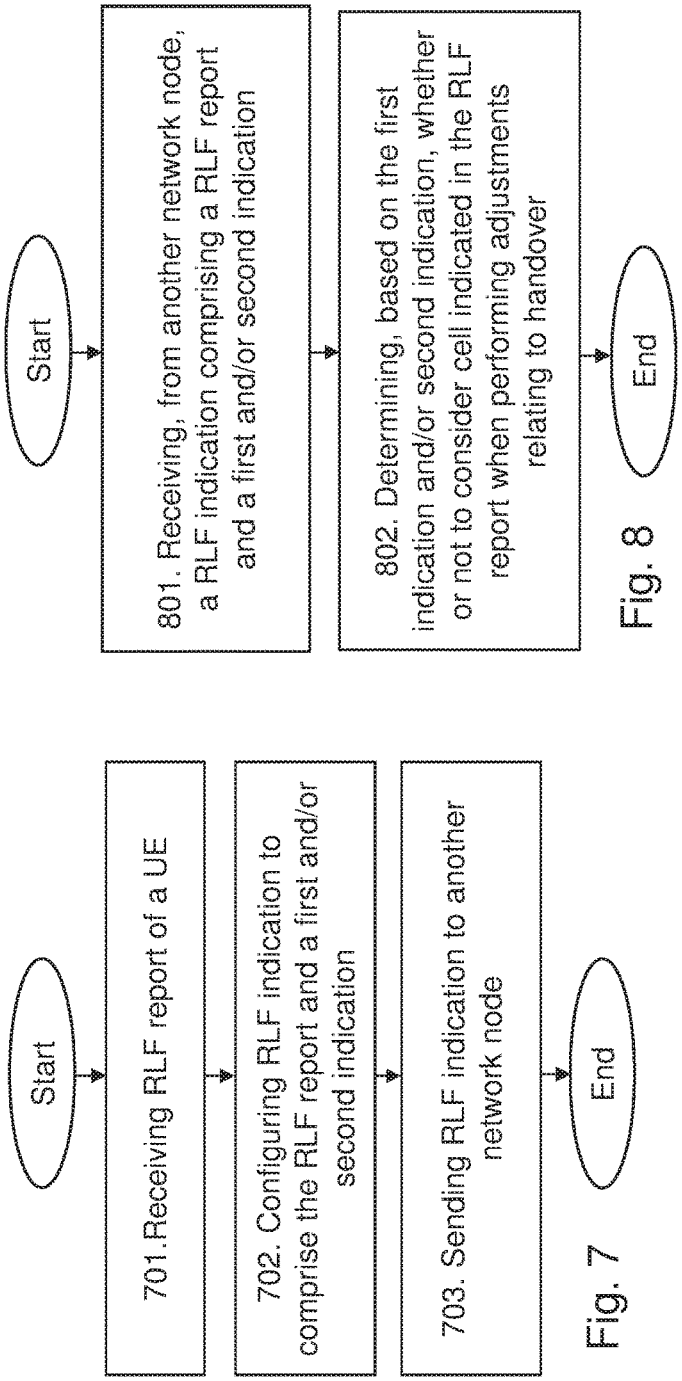
Fig. 7
Fig. 8

NETWORK NODES AND METHODS THEREIN FOR HANDLING COMMUNICATIONS IN A RADIO COMMUNICATIONS NETWORK

TECHNICAL FIELD

Embodiments herein relate to handling communications in a radio communications network. In particular, embodiments herein relate to network nodes and methods therein for handling communications in a radio communications network.

BACKGROUND

In a typical radio communications network, wireless terminals, also known as mobile stations and/or user equipments, UEs, communicate via a Radio Access Network, RAN, to one or more core networks. The radio access network covers a geographical area which is divided into cell areas, with each cell area being served by a base station, e.g., a radio base station, RBS, which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System, UMTS, is a third-generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially "flat" architecture comprising radio base station nodes without reporting to RNCs.

According to the latest discussions in 3GPP, a problem has been reported in R3-131285, "Impact on MRO from RRC re-establishment", Huawei, Fujitsu, CATT, RAN3 #81. The so-called ambiguity problem is that the UE reports the cell ID of the cell where a re-establishment of a connection, after a lost connection, will be attempted when the suitable cell is selected, and not when the re-establishment is completed, while the eNB will generate the Radio Link Failure, RLF, indication for each attempted re-establishment, independent if it is completed, succeeded or rejected, or incomplete. This leads to a problem of ambiguity in that not knowing whether the re-establishment cell is to be considered during a Mobility Robustness Optimization process or not.

Two solutions have been proposed to this problem in R3-131285. Both solutions rely on providing additional information to the eNB receiving the RLF indication. One solution is UE-based solution and the other solution is a network-based solution.

In the UE-based solution, the RLF report is modified to perform either of the following:
  Include an indicator in the RLF report to indicate whether the re-establishment was successful or rejected, or incomplete/failed;
  Only include re-establishment cell ID if the re-establishment was either successful or rejected;
  Include the causes of the failed re-establishment in the RLF report, such as, for example, no suitable cell can be selected, the selected cell is no longer suitable, the RRC re-establishment request is rejected, etc.
  Only send RLF Report when the re-establishment was either successful or rejected.

Although this UE-based solution is quite straightforward, it would require that the UE behavior to be modified. In addition to this, it would only solve the so-called ambiguity problem for Release12 UEs and not for legacy UEs, that is, it would not work for pre-Release 11 UEs or for UEs that do not support the enhancements as proposed by this UE-based solution.

In the network based solution, the basic idea is to add a flag into the first RLF indication, which is triggered by the re-establishment. This information can be stored in the receiving eNB and combined with a second RLF indication, which is triggered by the RLF report. This is possible since Release11 because the C-RNTI was added to the RLF report. This enables the eNB receiving the two RLF indications to match the RLF indications from the same event.

At re-establishment, the eNB sending the RLF indication would include the outcome of the re-establishment, and the eNB receiving this RLF indication would store: the C-RNTI, the time the RLF indication was received, and the reported outcome of the re-establishment. Thus, when the eNB receives the RLF indication triggered by the reception of an RLF report, the eNB can use the reported C-RNTI and a timer value, e.g. the time between failure and reporting, to retrieve the previously stored information. Alternatively, the eNB may also include this information in the HO report, if sent.

This network-based solution would be more complex for the eNB and would require some significant change in the X2AP RLF Indication. It would require the eNB to store the C-RNTI, the time the RLF indication was received and the reported outcome of the re-establishment for long periods of time, e.g. up to 48 hours, in order to possibly combine with a second RLF indication.

Both these solutions will thus affect the performance of the radio communications network, for example, by not affecting legacy user equipments and involving a complex alteration in the eNB.

SUMMARY

It is an object of embodiments herein to improve the performance of the radio communications network when handling communications in the radio communications network.

According to a first aspect of embodiments herein, the object is achieved by a method performed by a network node for handling communications in a radio communications network. The network node is configured to be in the radio communications network. The network node receives a report of a radio link failure, RLF, of a user equipment, UE, which report comprises an identity of a re-establishment cell. The network node also configures an RLF indication comprising the received report to further comprise a first indication of the cell identity of the cell the UE was connected to upon sending the RLF report and/or a second indication of a result of a comparison between the cell identity of the cell the UE was connected to upon sending the RLF report and the identity of the re-establishment cell, and sends the RLF indication to another network node.

According to a second aspect of embodiments herein, the object is achieved by a method performed by a network node for handling communications in a radio communications network. The network node is configured to be in the radio communications network. The network node receives, from another network node, an RLF indication comprising a report of a radio link failure, RLF, of a user equipment, UE, which report comprises an identity of a re-establishment cell. The RLF indication further comprises a first indication of the cell identity of the cell the UE was connected to upon sending the RLF report and/or a second indication of a result of a comparison between the cell identity of the cell the UE was connected to upon sending the RLF report and the identity of the re-establishment cell. The network node also determines, based on the first indication and/or the second indication, whether or not to consider the re-establishment cell indicated in the report of the RLF indication when performing adjustments relating to handover in a cell served by the network node.

According to a third aspect of embodiments herein, the object is achieved by a network node for handling communications in a radio communications network. The network node is configured to be in the radio communications network. The network node is further configured to receive a report of a radio link failure, RLF, of a user equipment, UE, which report comprises an identity of a re-establishment cell. The network node is also further configured to configure an RLF indication comprising the received report to further comprise a first indication of the cell identity of the cell the UE was connected to upon sending the RLF report and/or a second indication of a result of a comparison between the cell identity of the cell the UE was connected to upon sending the RLF report and the identity of the re-establishment cell, and send the RLF indication to another network node.

According to a fourth aspect of embodiments herein, the object is achieved by a network node for handling communications in a radio communications network. The network node is configured to be in the radio communications network. The network node is further configured to receive, from another network node, an RLF indication comprising a report of a radio link failure, RLF, of a user equipment, UE, which report comprises an identity of a re-establishment cell. The RLF indication further comprises a first indication of the cell identity of the cell the UE was connected to upon sending the RLF report and/or a second indication of a result of a comparison between the cell identity of the cell the UE was connected to upon sending the RLF report and the identity of the re-establishment cell. The network node is also further configured to determine, based on the first indication and/or the second indication, whether or not to consider the re-establishment cell indicated in the report of the RLF indication when performing adjustments relating to handover in a cell served by the network node.

By having the network node receiving the RLF report from a UE inform the network node which served the UE when the RLF occurred about either whether the re-establishment cell of the RLF report is the same cell as where a successful re-establishment has been carried out or about the identity of the cell where a successful re-establishment has been carried out, the network node which served the UE when the RLF occurred is enabled to determine whether or not to consider the cell identified in the RLF report when performing adjustments relating to handover in the cell where the RLF occurred. This may, for example, be performed by sending an enhanced RLF indication comprising a new information element, IE, or by specific interpretation of existing IEs in the RLF indication.

Thus, the network node which served the UE when the RLF occurred is able to discard or exclude the re-establishment cell of the RLF report when this re-establishment cell is not a good candidate to use when optimizing handover performance of the cell where the RLF occurred, such as, for example, in a Mobility Robustness Optimization. This solves the ambiguity problem described above, and will lead to an improved performance of the radio communications network when handling communications in the radio communications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 6 is a schematic block diagram illustrating embodiments in a radio communications network FIG. 7 is a flowchart depicting embodiments of a method in a network node.

FIG. 8 is another flowchart depicting embodiments of a method in a network node.

DETAILED DESCRIPTION

Figure 1:
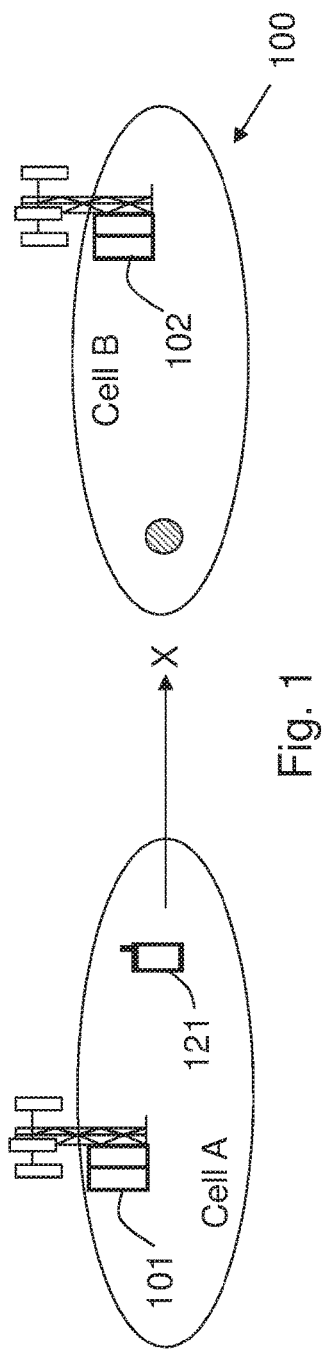
FIG. 1 is a schematic block diagram illustrating a successful re-establishment in cell B after an RLF.

The figures are schematic and simplified for clarity, and they merely show details that are useful to the understanding of the embodiments presented herein, while other details have been left out. Throughout, the same reference numerals are used for identical or corresponding parts or steps.

As part of the developing of the embodiments described herein, the so-called ambiguity problem, described in short in the background section above, will be further discussed below.

One of the goals of a consistent Mobility Robustness Optimization, MRO, is to make information about the RLF reports available in the network nodes where the failure originated, assuming these network nodes are the ones responsible to perform the proper adjustments or corrections, such as, e.g. adjust the hysteresis to avoid too late handovers. These adjustments or corrections may be applied to the cell pairs associated to the network node where the failure has occurred and to the cell where a successful re-establishment occurred.

According to E-UTRAN specification, TS 36.331 "Evolved Universal Terrestrial Radio Access (E-UTRA); Radio Resource Control (RRC); Protocol Specification", an RLF identified at the UE side is followed by a cell selection and an attempted to perform RRC connection re-establishment. No matter what the result of the re-establishment is, e.g. successful, rejected or incomplete/failure, the ReestablishmentCellId in the VarRLF-report will be set to the E-UTRAN selected cell. Hence, when the VarRLF-report reaches the network node where the failure occurred, this network node cannot interpret this re-establishment properly since it could be any of the three cases, i.e. successful, rejected or incomplete/failure.

According to E-UTRAN specification, TS 36.423 "Evolved Universal Terrestrial Radio Access Network (E-UTRAN); X2 Application Protocol", an X2AP RLF indication may be triggered by a re-establishment attempt, i.e. when "a re-establishment request is received". In this case, it does not necessarily require that the re-establishment is successful, rejected or incomplete/failed. Similarly, the reception of the X2AP RLF indication may also be ambiguous so that the network node receiving this RLF indication does not know if this was a successful case.

Thus, there is a problem of not knowing whether the re-establishment cell shall be considered during the process of mobility robustness optimisation. Namely, it is not possible for the network node receiving the RLF indication to judge whether the re-establishment cell was a real handover target towards which mobility parameters could be optimised, e.g. a case of successful re-establishment or rejection, or if the re-establishment cell should not be considered as a handover candidate towards which mobility parameters should be optimised, e.g. a case of re-establishment failure due to the re-establishment cell not being available anymore, such as, for example, because of an overshooting cell who's coverage was temporarily or erroneously stretching to the UEs position. This problem may thus be referred to as an ambiguity problem of the identity of the re-establishment cell, e.g. in R3-131285.

Furthermore, in some cases, the re-establishment fails during the procedure due to radio problems and the UE will abort the procedure and return to an RRC_IDLE state. This indicates that this re-establishment cell may not be suitable for mobility and may thus be excluded from the MRO analysis.

As described in R3-131285, in the HO too late case, the re-establishment cell is typically used to validate that the failure is not caused by a coverage hole and also indicates to which cell a handover should have been triggered earlier. But if the re-establishment fails during the procedure due to radio problems, e.g. due to the cell not being suitable anymore at the time the re-establishment is triggered, it may not be beneficial to adjust the mobility parameters towards that reported re-establishment cell.

In the HO to wrong cell case, the cell selected for the failed handover is typically adjusted to make the handover occur later. But it is also possible to trigger future handovers to the re-establishment cell earlier. But if the re-establishment fails during the procedure due to radio problem it will not be beneficial to adjust the mobility parameters: for example, the re-establishment cell selected by the UE and included in the RLF report may be an overshoot cell only temporarily available in that area and the re-establishment failure may be due to such cell not being available anymore at the time of re-establishment request.

In the HO too early case, the re-establishment cell can be the same as the source cell in case of HOF. In this case, the problem does not exist, since the analysis is performed in the same eNB where the UE attempts to re-establish. But if the RLF occurs after staying a short time in the target cell after a successful handover, the re-establishment cell will trigger an RLF indication to the target cell which may respond with a HO report back to the source cell. If the re-establishment fails during the procedure due to e.g. lack of resources at source base station, adjusting the handover to take place later will not help to resolve the situation, since the UE was not able to re-establish back to the last serving cell.

Furthermore, and also as part of the developing of the embodiments described herein, the ambiguity problem will be described in more detail below with reference to FIGS. 1-5.

FIG. 1 shows a schematic block diagram illustrating an example of a successful re-establishment of a UE 121 in cell B of the network node 102 after an RLF occurred while the UE 121 was served in cell A by the network node 101. The prior art signaling performed by the involved entities in the scenario of FIG. 1 is shown by the signaling diagram in FIG. 2.

In Action 201, the network node 101 serves the UE 121 with an established RRC connection. In Action 202, in response to a RLF, the UE 121 will perform cell selection and attempt to perform RRC connection establishment toward the selected cell; for example, by sending a RCC Connection Re-establishment Request message to network node 102 serving cell B. In this case, the network node 102 may respond with a RCC Connection Re-establishment Response message, which may be confirmed by the UE 121 in a RCC Connection Re-establishment Complete message. This successfully re-establishes the RRC connection of the UE 121 in cell B of the network node 102. In accordance with TS 36.331, in e.g. sections 5.3.7 and 5.4.2.3, the UE 121 will also generate a RLF report, which may be stored for up to 48 hours, and notify the network node 102 that the RLF report is available. In Action 203, the network node 102 requests the information in the RLF report, e.g. using a UEInformationRequest message in accordance with TS 36.331, sections 5.6.5.3. In Action 204, the UE 121 responds by sending the RLF report to the network node 102, e.g. using a UEInformationResponse message. In Action 205, the network node 102 sends an RLF indication comprising the RLF report to the network node 101, e.g. in accordance with the RLF indication procedure defined in TS 36.300 "Evolved Universal Terrestrial Radio Access (E-UTRA) and Evolved Universal Terrestrial Radio Access Network (E-UTRAN); Overall description; Stage 2". This will result in that the network node 101 receives an RLF report indicating the cell identity of the failed cell, i.e. cell A, and the cell identity of the re-establishment cell, i.e. cell B.

Figure 3:
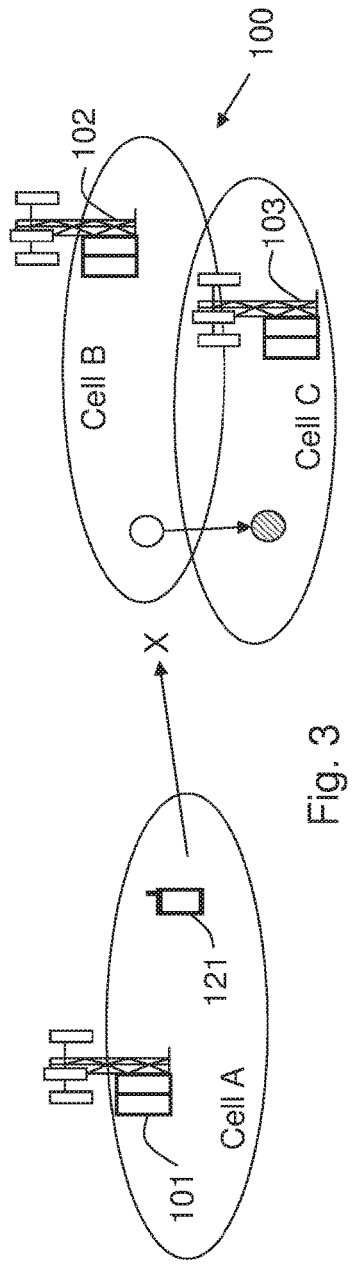
FIG. 3 is a schematic block diagram illustrating a successful re-establishment in cell C after an RLF and a failed or rejected re-establishment in cell B.

Now consider the scenario in FIG. 3. FIG. 3 shows a schematic block diagram illustrating an example of a successful re-establishment of a UE 121 in cell C of the network node 103 after an RLF occurred while the UE 121 was served in cell A by the network node 101. Prior art signaling that may be performed by the involved entities in the scenario of FIG. 3 is shown by the signaling diagrams in FIGS. 4-5.

Figure 4:
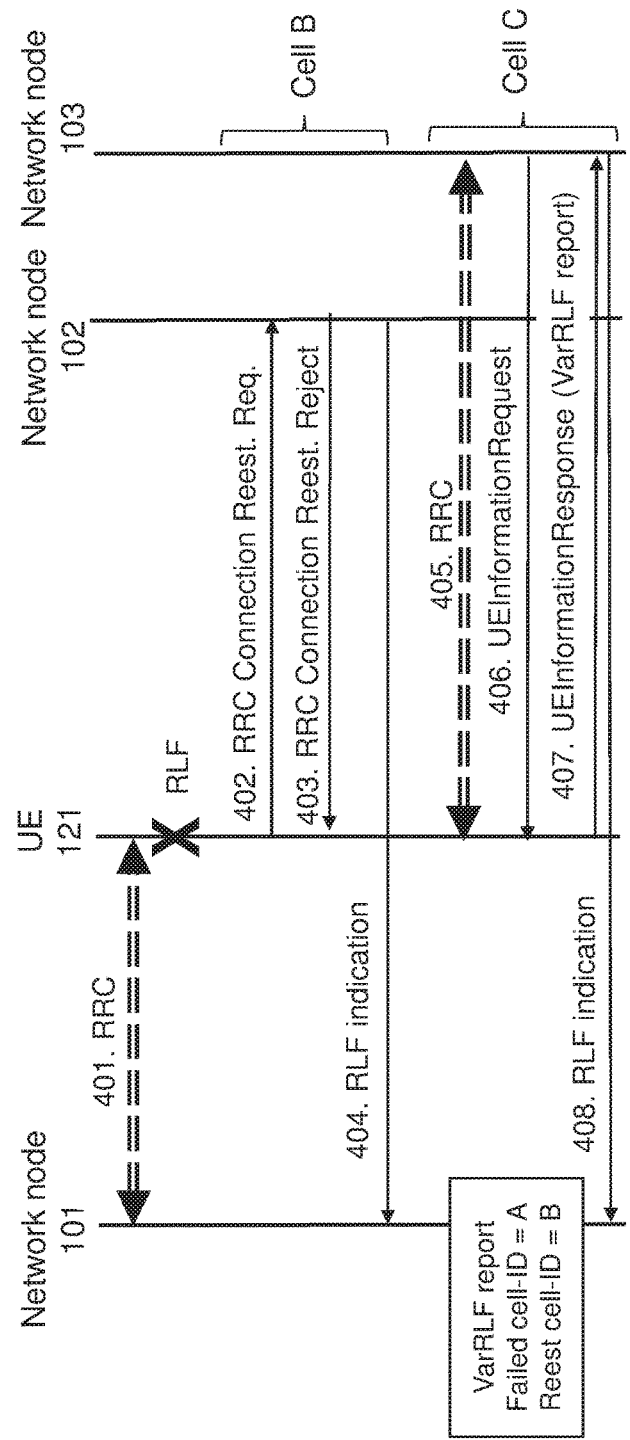
FIG. 4 and FIG. 5 are signaling diagrams depicting signaling in the scenario of FIG. 3 according to prior art.

FIG. 4 shows an example of when the UE 121 also performed a rejected re-establishment in cell B of network node 102 in between the RLF occurrence and the successful re-establishment. As shown in FIG. 4, the following actions may be performed.

In Action 401, the network node 101 serves the UE 121 with an established RRC connection. In Action 402, the UE 121 selects cell B in the cell selection and send a RCC Connection Reestablishment Request message to network node 102 serving cell B, which is received by the network node 102. In accordance with TS 36.331, sections 5.3.7.3 and 5.3.7.4, this includes setting the re-establishment cell in the RLF report to cell B. In Action 403, the network node 102 rejects the re-establishment attempt by the UE 121. In Action 404, the network node 102 sends a RLF indication to the network node 101, e.g. in accordance with the RLF indication procedure defined in TS 36.300 "Evolved Universal Terrestrial Radio Access (E-UTRA) and Evolved Universal Terrestrial Radio Access Network (E-UTRAN); Overall description; Stage 2". This will result in that the network node 101 receives a first RLF indication without an RLF report. In Actions 405-408, the UE 121 may perform a successful RRC Connection Reestablishment toward the selected cell C. This may be performed in the same manner as described in Actions 202-205. This will result in that the network node 101 receives a second RLF indication comprising a RLF report indicating the cell identity of the failed cell, i.e. cell A, and the set cell identity of the re-establishment cell, i.e. cell B.

Figure 5:
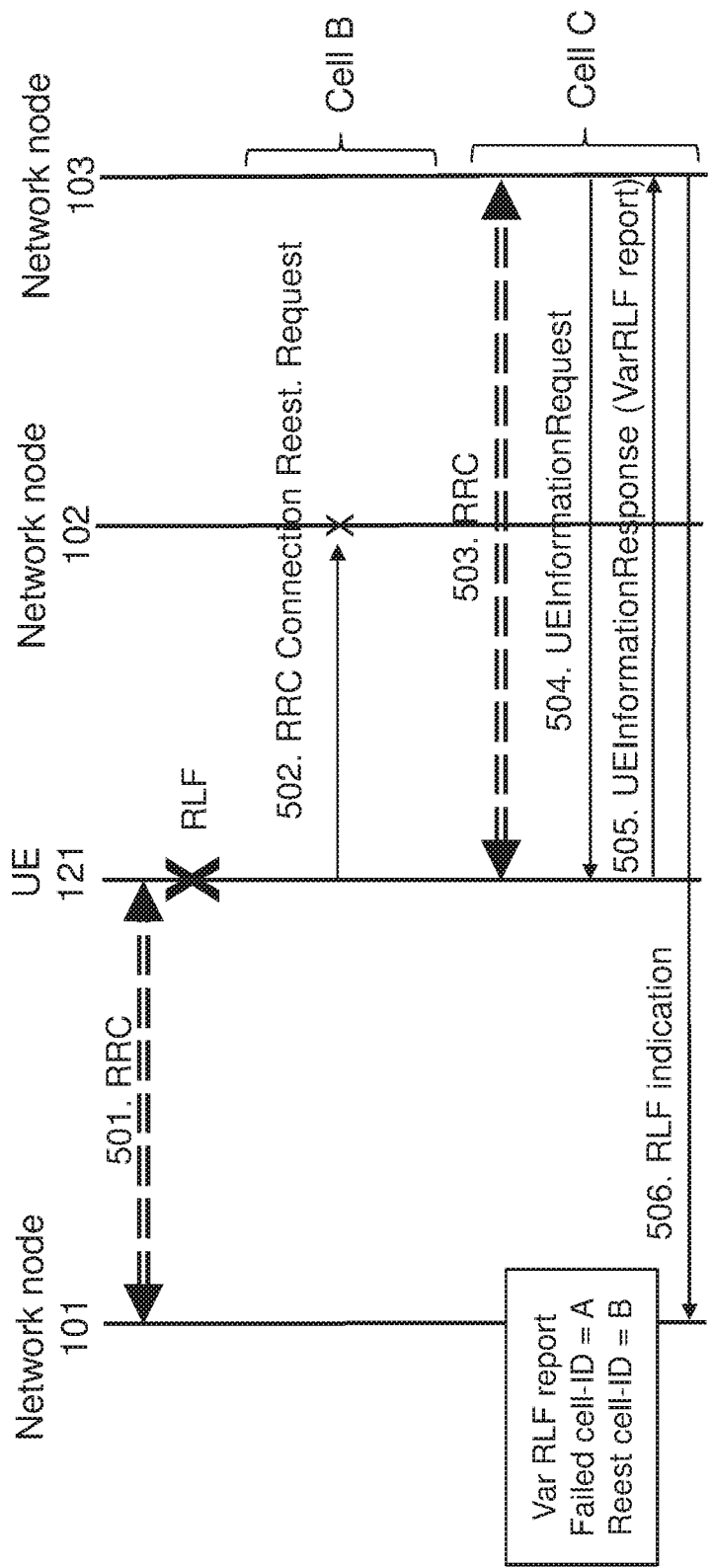

FIG. 5 shows an example of when the UE 121 also performed an incomplete/failed re-establishment in cell B of network node 102 in between the RLF occurrence and the successful re-establishment. As shown in FIG. 5, the following actions may be performed.

In Action 501, the network node 101 serves the UE 121 with an established RRC connection. In Action 502, the UE 121 selects cell B in the cell selection and attempt to perform RRC connection establishment toward the selected cell B. In accordance with TS 36.331, sections 5.3.7.3 and 5.3.7.4, this includes setting the re-establishment cell in the RLF report to cell B. However, the RCC Connection Reestablishment Request message to network node 102 serving cell B may not be sent by the UE 121. This may occur when, at the time the UE 121 is ready to send the message, the signal strength towards network node 102 has deteriorated such that it is no longer suitable to connect to. Another alternative is that the RCC Connection Reestablishment Request message to network node 102 serving cell B for some reason is not received by the network node 102. A further alternative is that, after the UE 121 has sent the RCC Connection Reestablishment Request message, a timer at the UE 121 may expire causing the UE 121 to leave the RRC_CONNECTED state, e.g. timer T301 according to TS 36.331. These different scenarios will result in an incomplete/failed re-establishment in cell B of network node 102, e.g. as defined in TS 36.331 section 5.3.7, but the re-establishment cell in the RLF report at the UE 121 will still be set to cell B. In Actions 503-506, the UE 121 may perform a successful RRC Connection Reestablishment toward the selected cell C. This may be performed in the same manner as described in Actions 202-205. This will result in that the network node 101 receives a RLF indication comprising a RLF report indicating the cell identity of the failed cell, i.e. cell A, and the set cell identity of the re-establishment cell, i.e. cell B.

From the different scenarios in FIGS. 1-5, it may be seen that the network node 101 cannot be sure whether the re-establishment cell in the RLF report, i.e. cell B in the scenarios above, was a successful re-establishment or not. Thus, the network node 101 receiving the RLF indication, with or without an RLF-report, is not able to differentiate between these scenarios; namely it becomes ambiguous at the network node 101 to understand towards which cell to perform mobility adjustments and how. Hence, MRO analysis cannot perform actions towards the proper re-establishment cell.

To aggravate this problem there is also the case of when UEs do not support RLF reporting, which translates into cases where the RLF INDICATION message does not contain the RLF Report. The RLF Report comprises further useful information, such as, for example, neighbouring cell measurements which could reveal if a re-establishment cell is a good handover candidate from a radio point of view. However, even though these measurements cannot resolve the ambiguity coming from reception of multiple RLF INDICATION messages or coming from the fact that the re-establishment cell in RLF INDICATION is not the cell where re-establishment succeeded or was deliberately rejected by the re-establishment network node 103, these measurements could help in taking a more educated decision on MRO. However, in case of UEs not supporting RLF Reports, this information is not available.

In short, the current standards or any vendor implementation do not support the network node 101 in deciding if a re-establishment cell in the RLF report is associated to a successful or rejection re-establishment, or an incomplete/failed case, which would be important in order to achieve an optimal MRO performance. Given this ambiguity, the network node 101 cannot e.g. select which RLF reports to reject or consider in the MRO analysis.

These issues are addressed by embodiments described herein, which are exemplified and explained in more detail below with reference to FIGS. 6-13.

FIG. 6 depicts a radio communications network 100 in which embodiments herein may be implemented. In some embodiments, the radio communications network 100 may be a wireless communications network such as a Long Term Evolution (LTE), LTE-Advanced, Wideband Code Division Multiple Access (WCDMA). Global System for Mobile communications/Enhanced Data rate for GSM Evolution (GSM/EDGE), Worldwide Interoperability for Microwave Access (WiMax), Ultra Mobile Broadband (UMB), any 3GPP cellular network, or any other cellular network or system. The radio communication network 100 is exemplified herein as an LTE network.

The radio communications system 100 comprises a number of network nodes 110, 111, 112. The network nodes 110, 111, 112 each serve at least one cell A, cell B, cell C, respectively. The network nodes 110, 111, 112 may also be configured to communicate with each other using e.g. X2 signaling over an X2 interface. The network node 110, 111, 112 may e.g. be an radio base station, eNB, eNodeB, a Home Node B, a Home eNode B, femto Base Station (BS), pico BS or any other network unit capable to capable of communicating with a user equipment within the cell served by the network node depending e.g. on the radio access technology and terminology used. The network node 110, 111, 112 may also be e.g. a base station controller, a network controller, a relay node, a repeater, an access point, a radio access point, a Remote Radio Unit (RRU) or a Remote Radio Head (RRH).

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell A uniquely in the whole radio communication network 100 is also broadcasted in the cell A. The network node 110 communicates over the air or radio interface operating on radio frequencies with the UE 121 within range of the network node 110.

In FIG. 6, a user equipment 121 is located within the cell A. The UE 121 is configured to communicate within the radio communications network 100 via the network node 110 over a radio link when present in the cell A served by the network node 110. The UE 121 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device or Machine to Machine (M2M) device, Customer Premises Equipment (CPE), etc.

It should be noted that in the description, a single radio access technology has been considered, in an intra-frequency scenario. However, the embodiments herein can apply to any radio access technology with similar constraints and supporting similar solutions. Embodiments herein also apply to an inter-frequency or inter-RAT scenario.

Example of embodiments of a method performed by a network node 111, 112 for handling communications in a radio communications network 100, will now be described with reference to a flowchart depicted in FIG. 7. Here, the network nodes 111, 112 are configured to be in the radio communications network 100. FIG. 7 is an illustrated example of exemplary actions or operations which may be taken by either one of the network nodes 111, 112. The method may comprise the following actions.

Action 701

In this action, the network node 111, 112 receives a report of a radio link failure, RLF, of a UE 121 which report comprises an identity of a re-establishment cell.

For example, the RLF report may be received in a UEInformationResponse message from the UE 121 triggered by a UEInformationRequest message following a successful re-establishment of a RRC connection between the UE 121 and the network node 111, 112 in cell B or C, respectively. Here, it may be noted that the re-establishment cell is the first cell the UE 121 tries to connect to after the RLF despite of the result of the attempt.

Action 702

After receiving the RLF report, the network node 111, 112 configures an RLF indication comprising the received report to further comprise a first indication of the cell identity of the current cell the UE 121 is connected to and/or a second indication of a result of a comparison between the cell identity of the current cell the UE 121 is connected to and the identity of the re-establishment cell. This enables the network node 111, 112 to inform the network node 110, which served the UE when the RLF occurred, about either whether the re-establishment cell of the RLF report is the same cell as where a successful re-establishment has been carried out or about the identity of the cell where a successful re-establishment has been carried out. In some embodiments, the RLF indication may be a X2AP RLF INDICATION message. For example, as defined in 3GPP TS36.423 v11.5.0 "Evolved Universal Terrestrial Radio Access Network (E-UTRAN), X2 Application Protocol".

In some embodiments, the network node 111, 112 may configure the second indication in a dedicated Information Element, IE, in the RLF indication. This may, for example, be performed by the addition of a new IE to the X2AP RLF INDICATION message comprising additional information about the outcome of the re-establishment and the validity of the reestablishment cell stored in the RLF report. This IE may e.g. be referred to as ReestablishmentStatus or by a similar notation. In some embodiments, the network node 111, 112 may compare the identity of the re-establishment cell in the received report with the cell identity of the cell the UE was connected to upon sending the RLF report. In some embodiments, in case the comparison results in a match, the network node 111, 112 may configure the dedicated IE with a first value indicating a match. Otherwise, in case the comparison does not result in a match, the network node 111, 112 may configure the dedicated IE with a second value indicating that there was no match.

This may, for example, be performed by the network node 111, 112 by, in the case of a positive matching result between the re-establishment cell in the RLF Report and the cell where the UE 121 successfully re-establishes/re-connects and conveys the RLF report, setting the dedicated IE to a value indicating "SUCCESSFUL_REESTABLISHMENT". In the case of a negative matching result, the network node 111, 112 may set the dedicated IE to a value indicating "UNSUCCESSFUL_REESTABLISHMENT". An example of an RLF INDICATION message comprising a dedicated IE as described above is shown in Table 1 below.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| Failure cell PCI | M | | INTEGER (0 ... 503, ... ) | Physical Cell Identifier | YES | ignore |
| Re-establishment cell ECGI | M | | ECGI 9.2.14 | | YES | ignore |

TABLE 1-continued

| IE/Group Name | Presence | Range | IE type and reference | Semantics description | Criticality | Assigned Criticality |
|---|---|---|---|---|---|---|
| C-RNTI | M | | BIT STRING (SIZE (16)) | C-RNTI contained in the RRC Re-establishment Request message (TS 36.331 [9]) | YES | ignore |
| ShortMAC-I | O | | BIT STRING (SIZE (16)) | ShortMAC-I contained in the RRC Re-establishment Request message (TS 36.331 [9]) | YES | ignore |
| UE RLF Report Container | O | | OCTET STRING | RLF Report contained in the UEInformation Response message (TS 36.331 [9]) | YES | ignore |
| Reestablishment Status | O | | ENUMERATED (Successful Reestablishment, Unsuccessful Reestablishment, . . . ) | Informs the eNB where the failure has occurred if the reestablishment cell in the RLF report is the same where the RLF report was received. | YES | |
| RRC Conn Setup Indicator | O | | ENUMERATED (RRC Conn Setup, . . . ) | Included if the RLF Report within the UE RLF Report Container IE Is retrieved after an RRC connection setup or an incoming successful handover | YES | reject |
| RRC Conn Reestab Indicator | O | | ENUMERATED (reconfigurationFailure, handoverFailure, otherFailure, . . . ) | The Reestablishment Cause in RRCConnectionReestablishmentRequest message(TS 36.331 [9]) | YES | ignore |

In some embodiments, the network node 111, 112 may configure the dedicated IE with the first value indicating a match when the UE 121 has been handed over from the re-establishment cell to the current cell the UE is connected to. Here, it should be noted that when the UE 121 is handed over to the current cell the UE is connected to from the re-establishment cell, this may mean that the re-establishment to the re-establishment cell was successful but that the RLF Report was not retrieved by the network node 110 serving the re-establishment cell. Therefore, the network node 111, 112 may consider the re-establishment cell as a successful re-establishment cell and may set the new dedicated IE to a value indicating "SUCCESSFUL_REESTAB-LISHMENT". This may also be performed by the network node 111, 112 in case the network node 111, 112 is provided with information that connection to the re-establishment cell was successful by any other means, such as, e.g. by UE history information listing the successful handovers the UE 121 has performed.

In some embodiments, the network node 111, 112 may configure the first indication in an existing IE in the RLF indication. The existing IE may also be referred to herein as the existing legacy IE. This existing IE may, for example, be the Re-establishment cell ECGI IE of the X2AP RLF INDICATION message.

The RLF INDICATION message as per TS36.423 version 11.5.0, is as shown in the Table 2 below. As may be seen by Table 2, the RLF INDICATION message comprises a Re-establishment cell ECGI IE, which has been present since the introduction of the RLF INDICATION message. However, since the RLF Report from the UE 121 was enhanced as per 3GPP Release 10, the re-establishment cell information is also provided in the RLF Report. Table 3 below shows an excerpt from an RRC UEInformationResponse IE, which comprises an RLF Report. Moreover, it is defined that the Re-establishment cell ECGI IE shall be deliberately ignored when the following conditions, as specified in TS36.423 version 11.5.0, are satisfied: "If the RRC Conn Setup Indicator IE is present in the RLF INDICATION message, the eNB1 shall ignore the values in the Failure cell PCI IE, Re-establishment cell ECGI IE, C-RNTI IE and ShortMAC-I IE." The latter implies that network node 110 receiving the RLF INDICATION message shall ignore the Re-establishment cell ECGI IE if the RRC Conn Setup Indicator IE is present, i.e. if the UE 121 reconnects from RRC_IDLE after the RLF. Consequently, the network node 111, 112 sending the RLF INDICATION message does not have any specified rule on how to set the Re-establishment cell ECGI IE in the latter case. Indeed, there are no details at all how the Re-establishment cell ECGI IE shall be set by the network node 11, 112 in case a Release 10 RLF Report is available from the UE 121 and it comprises the E-CGI of a re-establishment cell.

TABLE 2

| IE/Group Name | Presence | Range | IE type and reference | Semantics description | Criticslity | Assigned Criticality |
|---|---|---|---|---|---|---|
| Message Type | M | | 9.2.13 | | YES | ignore |
| Failure cell PCI | M | | INTEGER (0 . . . 503, . . . ) | Physical Cell Identifier | YES | ignore |
| Re-establishment cell ECGI | M | | ECGI 9.2.14 | | YES | ignore |
| C-RNTI | M | | BIT STRING (SIZE (16)) | C-RNTI contained in the RRC Re-establishment Request message (TS 36.331 [9]) | YES | ignore |

TABLE 2-continued

| IE/Group Name | Presence | Range | IE type and reference | Semantics description | Criticslity | Assigned Criticality |
|---|---|---|---|---|---|---|
| ShortMAC-I | O | | BIT STRING (SIZE (16)) | ShortMAC-I contained in the RRC Re-establishment Request message (TS 36.331 [9]) | YES | ignore |
| UE RLF Report Container | O | | OCTET STRING | RLF Report contained in the UEInformation Response message (TS 36.331 [9]) | YES | ignore |
| RRC Conn Setup Indicator | O | | ENUMERATED (RRC Conn Setup, . . . ) | Included if the RLF Report within the UE RLF Report Container IE is retrieved after an RRC connection setup or an Incoming successful handover | YES | Reject |
| RRC Conn Reestab Indicator | O | | ENUMERATED (reconfiguration Failure, handoverFailure, otherFailure, . . . ) | The Reestablishment Cause in RRCConnectionReestablishmentRequest message(TS 36.331 [9]) | YES | Ignore |

TABLE 3

```
RLF-Report-r9 ::=            SEQUENCE {
  measResultLastServCell-r9      SEQUENCE {
    rsrpResult-r9                  RSRP-Range
    rsrqResult-r9                  RSRQ-Range               OPTIONAL
  },
  measResultNeighCells-r9        SEQUENCE {
    measResultEUTRA-r9             MeasResultList2EUTRA-r9      OPTIONAL,
    measResultListUTRA-r9          MeasResultList2UTRA-r9       OPTIONAL,
    measResultListGERAN-r9         MeasResultListGERAN          OPTTONAL,
    measResultsCDMA2000-r9         MeasResultList2CDMA2000-r9   OPTIONAL
  } OPTIONAL,
  ...,
  [[ locationInfo-r10           LocationInfo-r10       OPTIONAL,
     failedPCellID-r10             CHOICE {
       cellGlobalId-r10              CellGlobalIdEUTRA,
       pci-arfcn-r10                 SEQUENCE {
         physCellId-r10                PhysCellId,
         carrierFreq-r10               ARFCN-ValueEUTRA
       }
     }                                                       OPTIONAL,
     reestablishmentCellId-r10   CellGlobalIdEUTRA       OPTIONAL,
     timeConnFailure-r10         INTEGER (0..1023)       OPTIONAL,
     connectionFailureType-r10   ENUMERATED {rlf, hof}   OPTIONAL,
     previousPCellId-r10         CellGlobalIdEUTRA       OPTIONAL
  ]],
  [[ failedPCellId-v1090        SEQUENCE {
       carrierFreq-v1090            ARFCN-valueEUTRA-v9e0
     }                                                       OPTIONAL
  ]],
  [[ basicFields-r11            SEQUENCE {
       c-RNTI-r11                   C-RNTI,
       rlf-Cause-r11                ENUMERATED {
                                      t310-Expiry, randomAccessProblem,
                                      rlc-MaxNumRetx, spare1},
       timeSinceFailure-r11         TimeSinceFailure-r11
     }                                                       OPTIONAL,
     previousUTRA-CellId-r11     SEQUENCE {
       carrierFreq-r11              ARFCN-ValueUTRA,
       physCellId-r11               CHOICE {
         fdd-r11                      PhysCellIdUTRA-FDD,
         tdd-r11                      PhysCellIdUTRA-TDD
```

TABLE 3-continued

```
   },
      cellGlobalId-r11          CellGlobalIdUTRA           OPTIONAL
   }                                                       OPTIONAL,
   selectedUTRA-CellId-r11   SEQUENCE {
      carrierFreq-r11           ARFCN-ValueUTRA,
      physCellId-r11            CHOICE {
         fdd-r11                   PhysCellIdUTRA-FDD,
         tdd-r11                   PhysCellIdUTRA-TDD
      }
   }                                                       OPTIONAL
 ]]
}
```

Therefore, the network node 111, 112 receiving the RLF Report from the UE 121 may set the Re-establishment cell ECGI IE to the E-CGI of the cell where the UE 121 has established connection, i.e. a cell of the network node 111, 112.

Thus, if this cell is the same as the one identified by the ReestablishmentCellId IE present in the RLF Report, then the first re-establishment attempt the UE 121 made was successful. Otherwise, if the two cells are different, then the first re-establishment attempt made by the UE 121 was not successful.

Action 703

After the configuration, the network node 111, 112 sends the RLF indication to another network node 110. This enables the other network node 110 to determine whether or not to consider the cell identified in the RLF report when performing adjustments relating to handover in the cell where the RLF occurred. In other words, the network node 110 is enabled to discard or exclude the re-establishment cell of the RLF report when this re-establishment cell is not a good candidate to use when optimizing handover performance of the cell where the RLF occurred, such as, for example, in a Mobility Robustness Optimization. In some embodiments, the other network node is the network node 110 serving the UE when the RLF occurred.

Example of embodiments of a method performed by a network node 110 for handling communications in a radio communications network 100, will now be described with reference to a flowchart depicted in FIG. 8. Here, the network node 110 is configured to be in the radio communications network 100. FIG. 8 is an illustrated example of exemplary actions or operations which may be taken by the network node 110. The method may comprise the following actions.

Action 801

In this action, the network node 110 receives, from another network node 111, 112, an RLF indication comprising a report of a RLF of a UE 121 which report comprises an identity of a re-establishment cell. The RLF indication further comprises a first indication of the cell identity of the cell the UE was connected to upon sending the RLF report and/or a second indication of a result of a comparison between the cell identity of the cell the UE was connected to upon sending the RLF report and the identity of the re-establishment cell. This may, for example, be performed by receiving an enhanced RLF indication comprising a dedicated IE, or by specific interpretation of existing IEs in the RLF indication.

Action 802

After receiving the RLF indication, the network node 110 determines, based on the first indication and/or the second indication, whether or not to consider the re-establishment cell indicated in the report of the RLF indication when performing adjustments relating to handover in a cell served by the network node 110. In this way, the network node 110 is enabled to discard or exclude the re-establishment cell of the RLF report when this re-establishment cell is not a good candidate to use when optimizing handover performance of the cell where the RLF occurred, such as, for example, in a Mobility Robustness Optimization.

In some embodiments, when the second indication indicates that the result of the comparison is a match, the network node 110 may include the re-establishment cell when performing the adjustments relating to handover in a cell served by the network node 110. Otherwise, when the second indication indicates that the result of the comparison is not a match, the network node 110 may discard the identity of the re-establishment cell in the received report and exclude the re-establishment cell when performing the adjustments relating to handover in a cell served by the network node 110.

For example, when handling the RLF indication comprising a dedicated IE, i.e. carrying the second indication, at the network node 110, the network node 110 may receive the RLF indication comprising a dedicated IE and check its value. Thereafter, if the dedicated IE value indicates "SUCCESSFUL_REESTABLISHMENT", then the MRO function at the network node 110 should consider the re-establishment cell, i.e. ReestablishmentCellId IE, in the VarRLFReport as a valid re-establishment cell, i.e. a valid candidate for mobility optimization. Thus, consequently, the re-establishment cell pointed to or indicated in the RLF Report may be subject to mobility optimization adjustments for the handover trigger points to and from the source cell, i.e. the cell of the network node 110 in which the RLF occurred. On the other hand, if the dedicated IE value indicated "UNSUCCESSFUL_REESTABLISHMENT", then the MRO function at the network node 110 may discard the re-establishment cell, i.e. ReestablishmentCellId IE, in the VarRLFReport and exclude such cell from any optimization adjustments for the handover trigger point.

Alternatively, in the latter case, the network node 110 may also trigger one or more traces, e.g. Minimization of Drive Test, MDT, traces, for UEs to investigate the reason for the RLF in more detail. This may be performed by triggering a tracing function present via an Operation and Maintenance, OAM, system. This provides a possibility for the network node 110 to trigger MDT traces or measurements for cells receiving lots of RLF indications with RLF reports potentially discarded. The MDT traces or measurements may be useful to get radio measurements about the re-establishment cell the UE attempts to connect to.

Alternatively, in some embodiments, the network node 110 may compare the identity of the re-establishment cell comprised in the received report with the first indication indicating the cell identity of the cell the UE was connected to upon sending the RLF report. In some embodiments, when the result of the comparison is a match, the network node 110 may include the re-establishment cell when performing the adjustments relating to handover in a cell served by the network node 110. Otherwise, when the result of the comparison is not a match, the network node 110 may discard the identity of the re-establishment cell in the received report and exclude the re-establishment cell when performing the adjustments relating to handover in a cell served by the network node 110.

For example, when handling the RLF indication comprising the existing legacy IE, i.e. carrying the first indication, at the network node 110, the network node 110 should always consider the existing legacy IE, e.g. Re-establishment cell ECGI IE, as valid.

Thereafter, if the Re-establishment cell ECGI IE is equal to the re-establishment cell, i.e. ReestablishmentCellId IE, in the VarRLFReport, then the MRO function at the network node 110 should consider the re-establishment cell, i.e. ReestablishmentCellId IE, in the VarRLF Report as a valid re-establishment cell, i.e. a valid candidate for mobility optimization. Thus, consequently, the re-establishment cell pointed to or indicated in the RLF Report may be subject to mobility optimization adjustments for the handover trigger points to and from the source cell, i.e. the cell of the network node 110 in which the RLF occurred. On the other hand, if the Re-establishment cell ECGI IE is not equal to the re-establishment cell, i.e. ReestablishmentCellId IE, in the VarRLFReport, then the MRO function at the network node 110 may discard the re-establishment cell, i.e. ReestablishmentCellId IE, in the VarRLF Report and exclude such cell from any optimization adjustments for the handover trigger point. Alternatively, in the latter case, the network node 110 may also trigger one or more traces, e.g. Minimization of Drive Test, MDT, traces, for UEs to investigate the reason for the RLF in more detail. This may be performed by triggering a tracing function present via an Operation and Maintenance, OAM, system.

Also, in some embodiments, when the result of the comparison is not a match and/or the second indication indicates that the result of the comparison is not a match, the network node 110 may disregard any previously received RLF indications relating to the same RLF or UE 121, when performing the adjustments relating to handover in a cell served by the network node 110. This may be advantageous when handling cases where multiple RLF indication messages have been generated due to the same RLF occurrence.

In some RLF cases, a UE 121 may attempt to re-establish to a cell but be rejected by the network node. The UE 121 may then select another cell for re-establishment and connect to it, or the UE 121 may go into an RRC IDLE mode and re-connect at a later stage to a different cell. This scenario is exemplified by Actions 402-404 in FIG. 4 and by Actions 1102-1104 in FIG. 11.

In such a scenario, the network node where the first re-establishment was attempted may send an RLF indication message to the network node 110. This RLF indication message will not comprise the VarRLFReport as the UE 121 did not have the opportunity to signal a RRC UEInformationResponse message to the network node where the first re-establishment was attempted. However, this first RLF indication message may comprise the C-RNTI and the ShortMac-I IEs, which are identifiers for the UE 121 in network node 110 before the RLF occurrence. Thus, in some embodiments, the network node 110 may store the C-RNTI and ShortMac-I IEs RLF indication message together with some failed UE context information. Hence, if the UE 121 later successfully re-establishes connection in another cell and signals the RLF Report to the network node serving this cell, a new RLF indication message will be generated and sent to the network node 110. This RLF indication message will also comprise the C-RNTI and ShortMAC-I assigned to the UE 121 before the RLF occurrence. Thus, the network node 110 may store the multiple received RLF indication messages associated with the UE 121 by means of the C-RNTI and/or ShortMAC-I received in these RLF indication messages.

Consequently, if the information in the RLF indication message comprising the VarRLFReport reveals that the Re-establishment cell ECGI IE in the RLF indication message is not equal to the ReestablishmentCellId IE present in the Var-RLFReport, then the network node 110 may disregard any previous RLF indication message relative to the same UE 121 with regards to MRO. Namely, adjustments towards the E-CGI of the reestablishmentCellId IE may be preceded.

Advantageously, this provides a specific trigger for discarding ambiguous information in RLF indication messages. A further advantage is that it in a better way covers backward compatibility to existing legacy network nodes because it does not necessarily required the addition of a new dedicated IE to existing RLF indication messages. Therefore, the network node 110, when receiving a RLF indication messages comprising a C-RNTI and/or a Short-MAC-I of a UE 121 may automatically discard the ambiguous information in other previous RLF indication messages, wherein these previous RLF indication messages may refer to the same RLF, without the need for any significant changes in current interface protocols.

Furthermore, in some embodiments, when the first indication of the cell identity of the current cell the UE 121 is connected to is set to a particular determined value, the network node 110 may ignore the identity of the re-establishment cell in the received report and refrain from performing the adjustments relating to handover in a cell served by the network node 110 based on the first or second indication. It should here also be noted that when having network nodes that are sending RLF indication messages which do not support the embodiments described herein, i.e. legacy network nodes, such as, e.g. network nodes 102, 103 in FIGS. 1-5, and the network node 110 receiving these RLF indication messages which supports the embodiments described herein, compatibility therein between needs to be ensured. This may be performed by, for example, if the legacy network nodes have included the RRC Conn Setup Indicator IE in the RLF indication message, then the Re-establishment cell ECGI IE may be set to a value by the legacy network node such that it may be understood by the receiving network node 110 as not applicable. Thus, when the Re-establishment cell ECGI IE is set to a specific determined or configured value, e.g. a value not pointing at any E-CGI deployed, the receiving network node 110 should ignore the Re-establishment cell ECGI IE and not take the actions described in some of the embodiments above as a result of the comparison between the Re-establishment cell ECGI IE and the ReestablishmentCellId IE present in the Var-RLFReport.

It should also be noted that the adjustments relating to handover in a cell served by the network node 110 may comprise performing a Mobility Robustness Optimization, MRO, analysis and determining a trigger point for handover of the served by the network node 110. This may also be referred to herein as the MRO function in the network node 110.

Furthermore, in some embodiments, the network node 110 may receive both the first indication and the second indication as described above. By additionally adding the re-establishment cell explicitly in a dedicated IE in the RLF indication messages, this advantageously lets the network node 110 know that the information has been elaborated and validated by the network node 111, 112, and has not only been made available via UE 121 processes.

Figure 9:
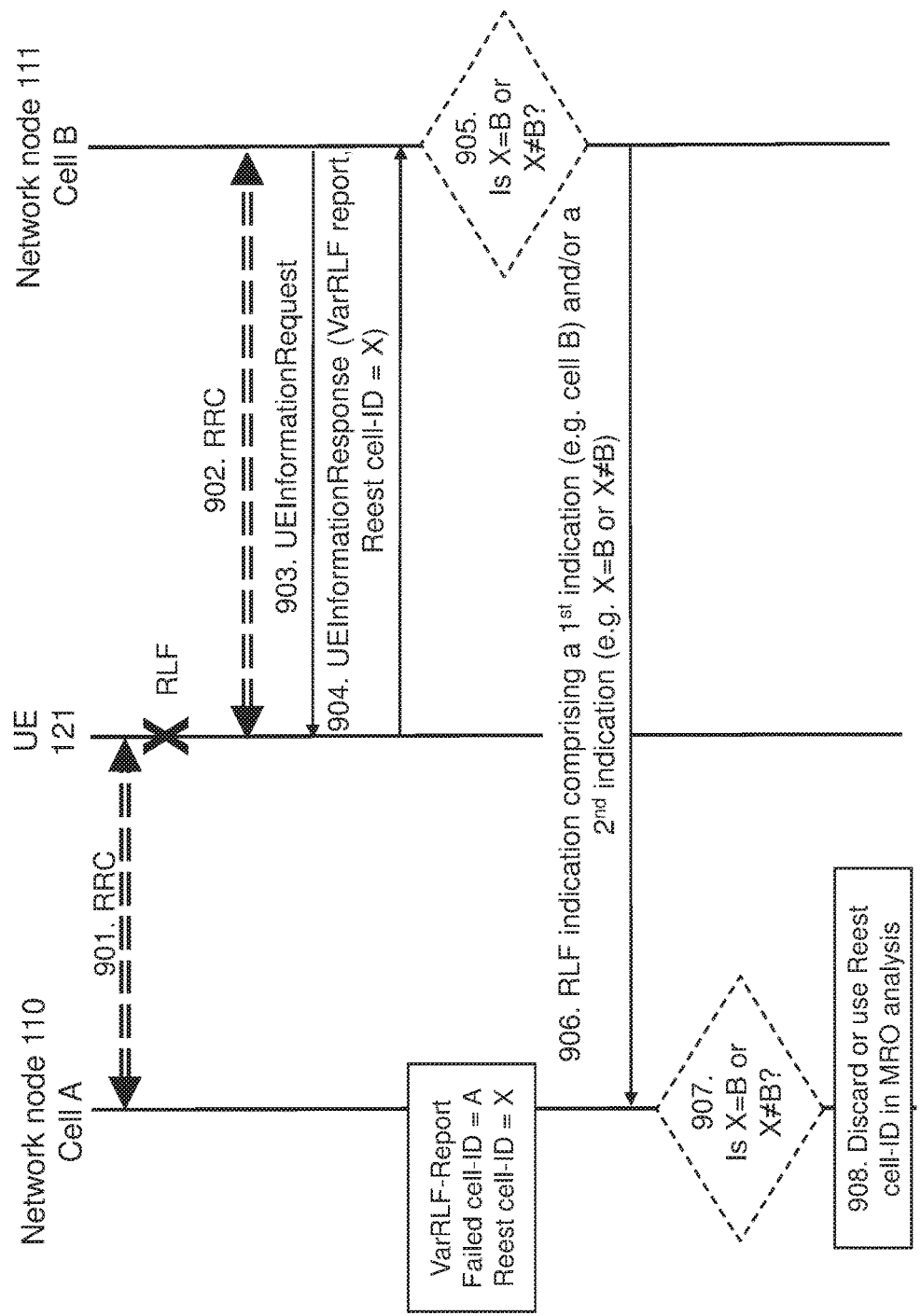
FIG. 9 is a signaling diagram depicting embodiments of a method in a network node.

FIG. 9 shows a signaling diagram depicting embodiments of methods in the network node 110, 111, 112 in a scenario where a successful re-establishment of a UE 121 in cell B of the network node 111 takes place after an RLF occurred while the UE 121 was served in cell A by the network node 110.

Figure 2:
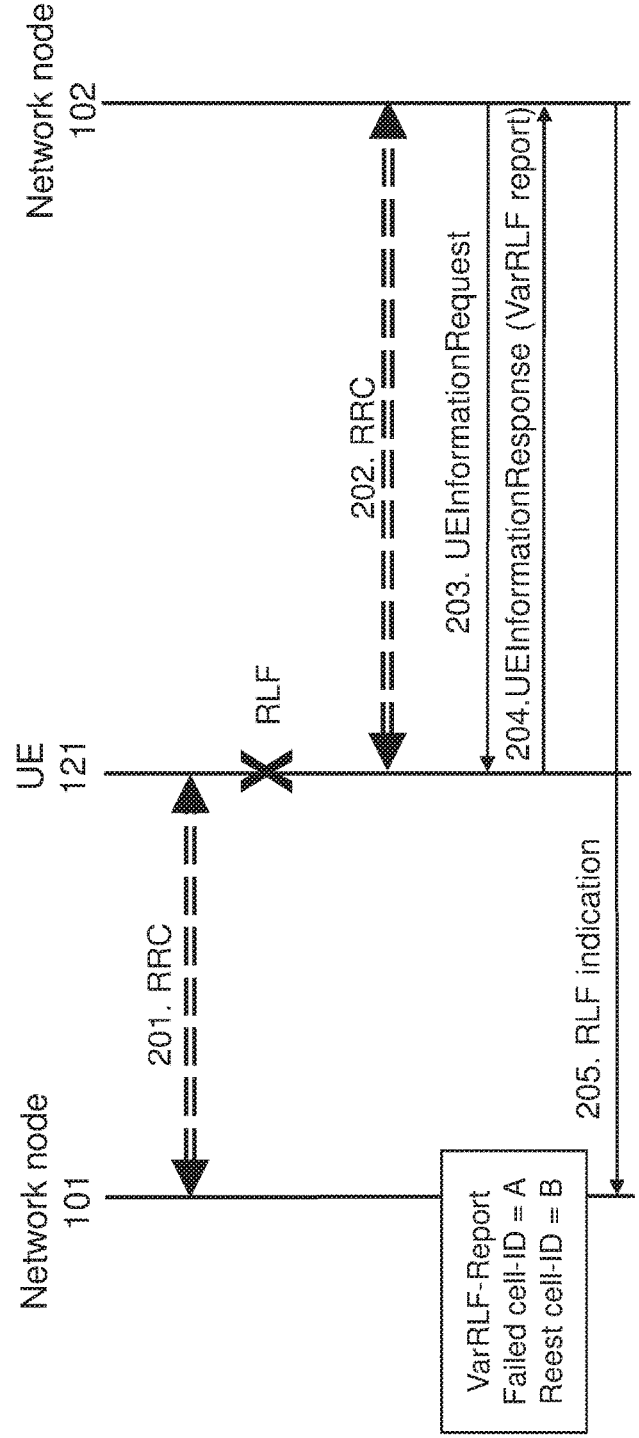
FIG. 2 is a signaling diagram depicting signaling in the scenario of FIG. 1 according to prior art.

Actions 901-904 correspond to the Actions 201-204 described with reference to FIG. 2 above.

In optional Action 905, the network node 111 may compare the identity of the re-establishment cell in the received RLF report, i.e. cell X, with the cell identity of the cell the UE was connected to upon sending the RLF report, i.e. cell B. In this example, cell X is the same as cell B.

In Action 906, the network node 111 sends an RLF indication comprising the RLF report to the network node 110. The RLF indication here further comprises a first indication of the cell identity of the current cell the UE is connected, i.e. cell B, and/or a second indication of the result of the comparison in Action 906.

In optional Action 907, upon receiving the RLF indication message, the network node 110 may compare the identity of the re-establishment cell in the received RLF report, i.e. cell X, with the cell identity of the cell the UE was connected to upon sending the RLF report, cell B, as indicated in the first indication. In this example, cell X is the same as cell B.

In Action 908, the network node 110 determines based on the first indication and/or the second indication, whether or not to consider the re-establishment cell indicated in the RLF report of the RLF indication, i.e. cell X, when performing adjustments relating to handover in cell A served by the network node 110. In this case, since the first and/or second indication will indicate a match, i.e. cell X is the same as cell B, the network node 110 considers the re-establishment cell, i.e. cell X, a valid re-establishment cell, i.e. a valid candidate for mobility optimization, and will use the re-establishment cell in MRO analysis.

Figure 10:
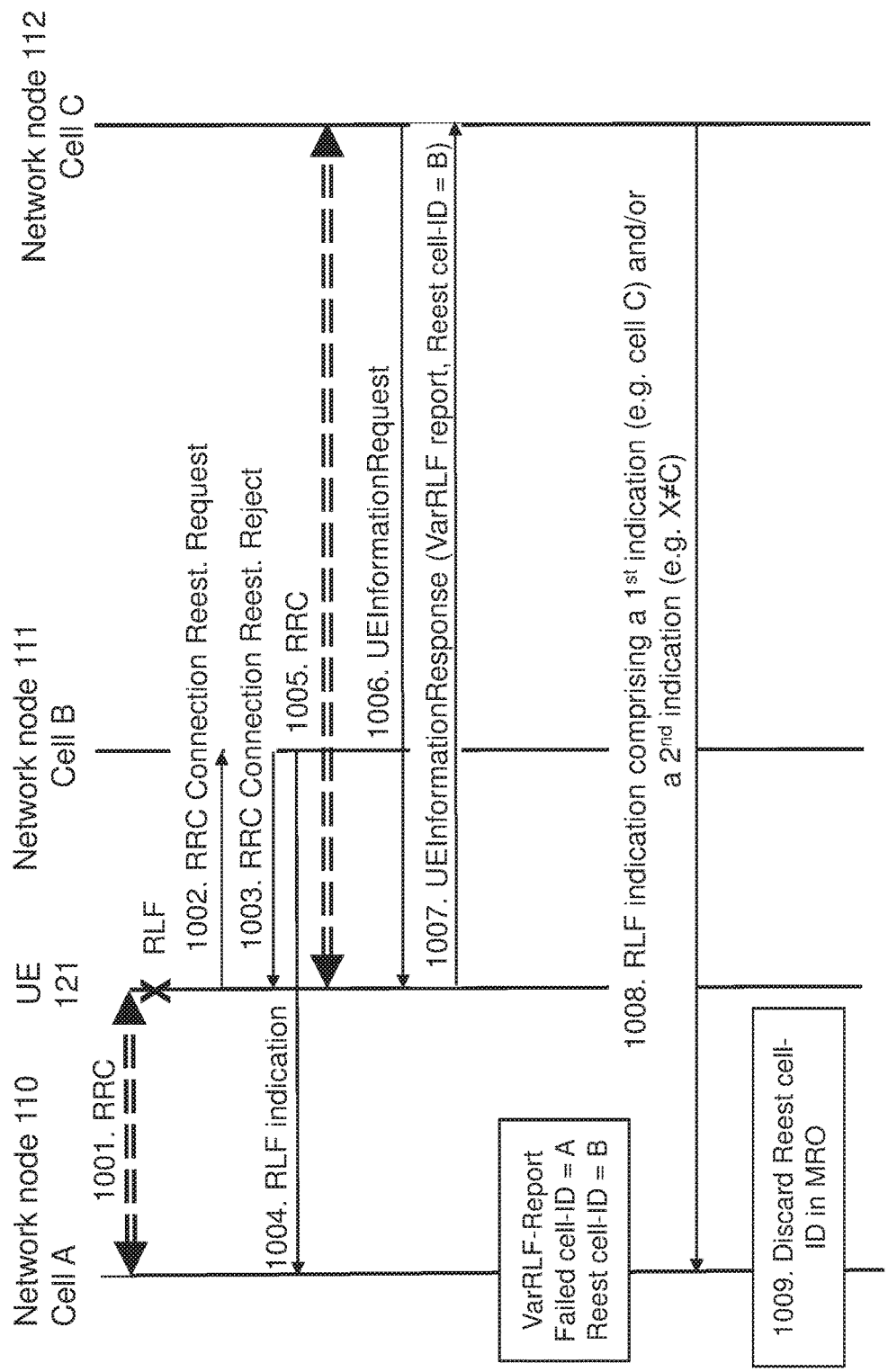
FIG. 10 is another signaling diagram depicting embodiments of a method in a network node.

FIG. 10 shows a signaling diagram depicting embodiments of methods in the network node 110, 111, 112 in a scenario where a successful re-establishment of a UE 121 in cell C of the network node 112 takes place after an RLF occurred while the UE 121 was served in cell A by the network node 110. In this scenario, the UE 121 also performs a rejected re-establishment in cell B of network node 111 in between the RLF occurrence and the successful re-establishment.

Actions 1001-1007 correspond to the Actions 401-407, respectively, described with reference to FIG. 4 above. It should also be noted that the optional actions corresponding to the optional Actions 905 and 907 described with reference to FIG. 9 may also be performed by the network nodes 110, 112 in this example, but have been omitted here for the sake of clarity. In Action 1008, the network node 111 sends an RLF indication comprising the RLF report to the network node 110. The RLF indication here further comprises a first indication of the cell identity of the current cell the UE is connected, i.e. cell C, and/or a second indication of a result of a comparison between the cell identity of the cell the UE was connected to upon sending the RLF report and the identity of the re-establishment cell. In Action 1009, the network node 110 determines based on the first indication and/or the second indication, whether or not to consider the re-establishment cell indicated in the RLF report of the RLF indication, i.e. cell B, when performing adjustments relating to handover in cell A served by the network node 110.

In this case, since the first and/or second indication will indicate that there is no match, i.e. cell C is not the same cell as cell B, the network node 110 may discard cell B as a non-valid re-establishment cell, i.e. not a valid candidate for mobility optimization. Here, it should be noted that, as previously mentioned above, since the RLF Report comprises further useful information, such as, for example, neighbouring cell measurements which could reveal if a re-establishment cell is a good handover candidate from a radio point of view, and these measurements could help in taking a more educated decision on MRO, these measurements may of course also be used in determining whether to discard or use cell B, even in the case where the first and/or second indication indicate that there is no match. Hence, the network node 110 may determine whether or not to discard the identity of the re-establishment cell in the received report and exclude the re-establishment cell when performing the adjustments relating to handover in a cell served by the network node 110 when the first and/or second indication indicate that there is no match.

Figure 11:
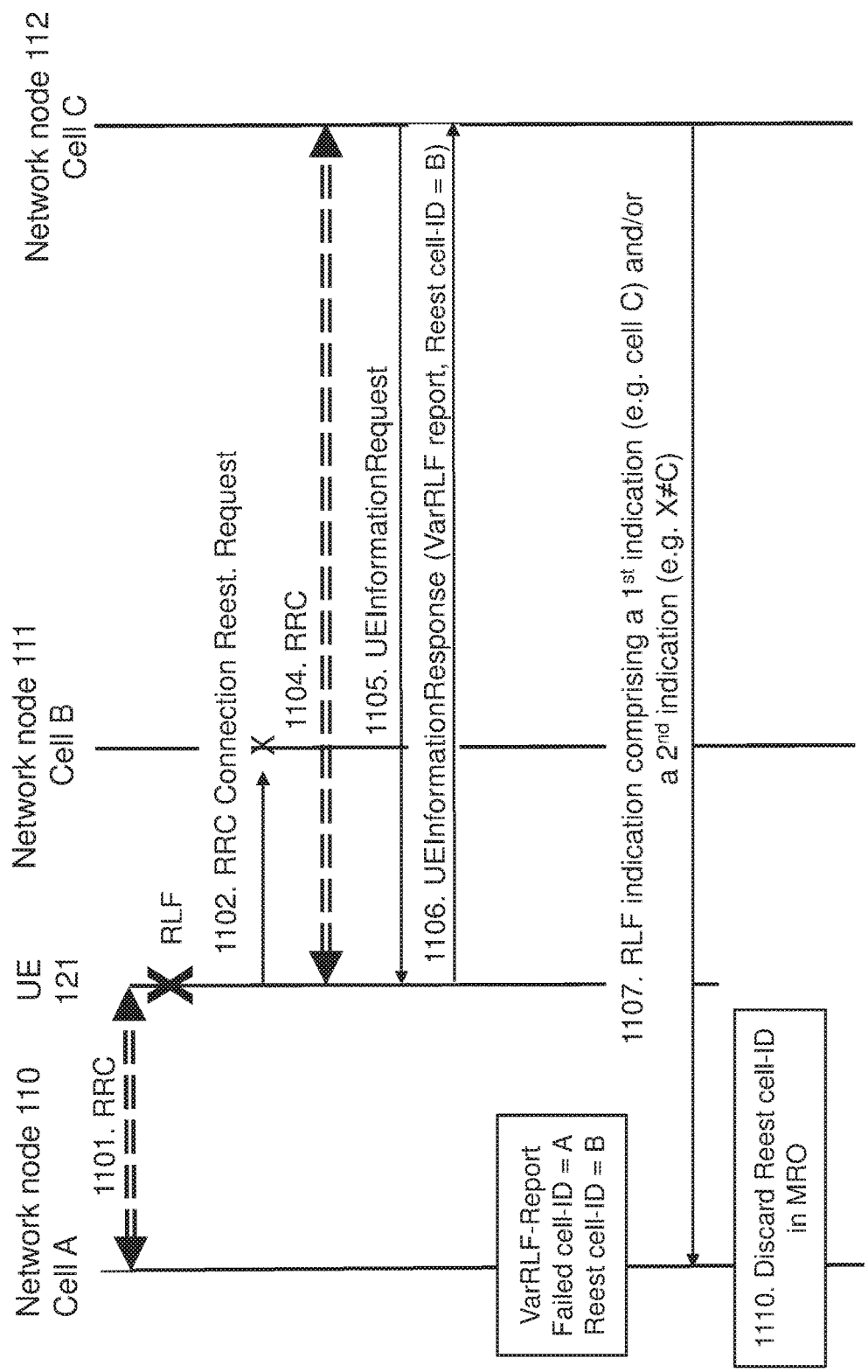
FIG. 11 is a further signaling diagram depicting embodiments of a method in a network node.

FIG. 11 shows a signaling diagram depicting embodiments of methods in the network node 110, 111, 112 in a scenario where a successful re-establishment of a UE 121 in cell C of the network node 112 takes place after an RLF occurred while the UE 121 was served in cell A by the network node 110. In this scenario, the UE 121 also performs an incomplete/failed re-establishment in cell B of network node 111 in between the RLF occurrence and the successful re-establishment.

Actions 1101-1106 correspond to the Actions 501-506, respectively, described with reference to FIG. 5 above. It should also be noted that the optional actions corresponding to the optional Actions 905 and 907 described with reference to FIG. 9 may also be performed by the network nodes 110, 112 in this example, but have been omitted here for the sake of clarity. In Action 1107, the network node 111 sends an RLF indication comprising the RLF report to the network node 110. The RLF indication here further comprises a first indication of the cell identity of the current cell the UE is connected, i.e. cell C, and/or a second indication of a result of a comparison between the cell identity of the cell the UE was connected to upon sending the RLF report and the identity of the re-establishment cell. In Action 1108, the network node 110 determines based on the first indication and/or the second indication, whether or not to consider the re-establishment cell indicated in the RLF report of the RLF indication, i.e. cell B, when performing adjustments relating to handover in cell A served by the network node 110.

In this cases, since the first and/or second indication will indicate that there is no match, i.e. cell C is not the same cell as cell B, the network node 110 may discard cell B as a non-valid re-establishment cell, i.e. not a valid candidate for mobility optimization. Here, it should be noted that, as previously mentioned above, since the RLF Report comprises further useful information, such as, for example, neighbouring cell measurements which could reveal if a re-establishment cell is a good handover candidate from a radio point of view, and these measurements could help in taking a more educated decision on MRO, these measurements may of course also be used in determining whether to discard or use cell B, even in the case where the first and/or second indication indicate that there is no match. Hence, the network node 110 may determine whether or not to discard the identity of the re-establishment cell in the received report and exclude the re-establishment cell when performing the adjustments relating to handover in a cell served by the network node 110 when the first and/or second indication indicate that there is no match.

Figure 12:
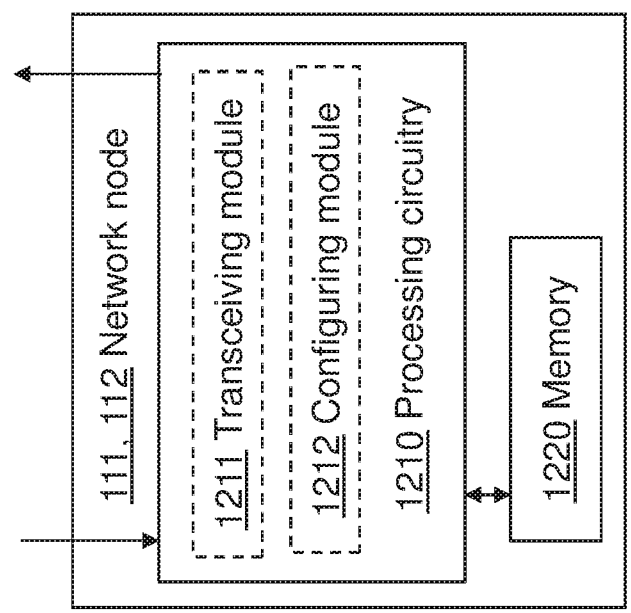
FIG. 12 is a block diagram depicting embodiments of a network node.

To perform the method actions in the network node 111, 112 for handling communications in a radio communications network 100, the network node 111, 112 may comprise the following arrangement depicted in FIG. 12. The network node 111, 112 is configured to be in the radio communications network 100.

FIG. 12 shows a schematic block diagram of embodiments of the network node 111, 112. In some embodiments, the network node 111, 112 may comprise a transceiving module 1211 and a configuring module 1212. In some embodiments, the network node 111, 112 may comprise a processing circuitry 1210, which may also be referred to as processing module. The processing circuitry 1210 may comprise one or more of the transceiving module 1211 and the configuring module 1212, and perform the function thereof as described below.

The network node 111, 112 is configured to, or may comprise a transceiving module 1211 configured to, receive a report of a RLF of a UE 121 which report comprises an identity of a re-establishment cell. The network node 111, 112 is also configured to, or may comprise a configuring module 1211 configured to, configure an RLF indication comprising the received report to further comprise a first indication of the cell identity of the current cell the UE 121 is connected to and/or a second indication of a result of a comparison between the cell identity of the current cell the UE 121 is connected to and the identity of the re-establishment cell. The network node 111, 112 is configured to, or may comprise a transceiving module 1211 configured to, send the RLF indication to another network node. In some embodiments, the RLF indication may be a X2AP RLF INDICATION message. For example, as defined in 3GPP TS36.423 v 1.5.0 "Evolved Universal Terrestrial Radio Access Network (E-UTRAN), X2 Application Protocol". In some embodiments, the network node 111, 112 may be configured to, or may comprise a configuring module 1212 configured to, configure the second indication in a dedicated IE in the RLF indication. In some embodiments, the network node 111, 112 may be configured to, or may comprise a configuring module 1212 configured to, compare the identity of the re-establishment cell in the received report with the cell identity of the current cell the UE 121 is connected to. Also, in some embodiments, the network node 111, 112 may be configured to, or may comprise a configuring module 1212 configured to, configure the dedicated IE with a first value indicating a match when the comparison results in a match and with a second value indicating not a match when the result of the comparison is not a match. Further, in some embodiments, the network node 111, 112 may be configured to, or may comprise a configuring module 1212 configured to, configure the dedicated IE with the first value indicating a match when the UE has been handed over from the re-establishment cell to the current cell the UE is connected to. In some embodiments, the network node 111, 112 may be configured to, or may comprise a configuring module 1212 configured to, configure the first indication in an existing IE in the RLF indication. The existing IE in the RLF indication may, for example, be the Re-establishment cell ECGI IE of the X2AP RLF INDICATION message. Furthermore, the other network node may be the network node 110 serving the UE 121 when the RLF occurred.

The embodiments for handling communications in a radio communications network 100 may be implemented through one or more processors, such as, e.g. the processing circuitry 1210 in the network node 111, 112 depicted in FIG. 12, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1210 in the network node 111, 112. The computer program code may e.g. be provided as pure program code in the network node 111, 112 or on a server and downloaded to the network node 111, 112. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 111, 112 may further comprise a memory 1220, which may be referred to or comprise one or more memory modules or units. The memory 1220 may be arranged to be used to store executable instructions and data to perform the methods described herein when being executed in the network node 111, 112. Those skilled in the art will also appreciate that the processing circuitry 1210 and the memory 1220 described above may refer to a combination of analog and digital circuits, and/or one or more processors configured with software and/or firmware, e.g. stored in the memory 1220, that when executed by the one or more processors such as the processing circuitry 1210 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, a computer program, comprising instructions which, when executed on at least one processor, e.g. the processing circuitry or module 1210, cause the at least one processor to carry out the method for handling communications in a radio communications network 100 as described above is presented. Also, a carrier containing the computer program, wherein the carrier is one of an electronic signal, optical signal, radio signal, or computer readable storage medium, is presented.

Figure 13:
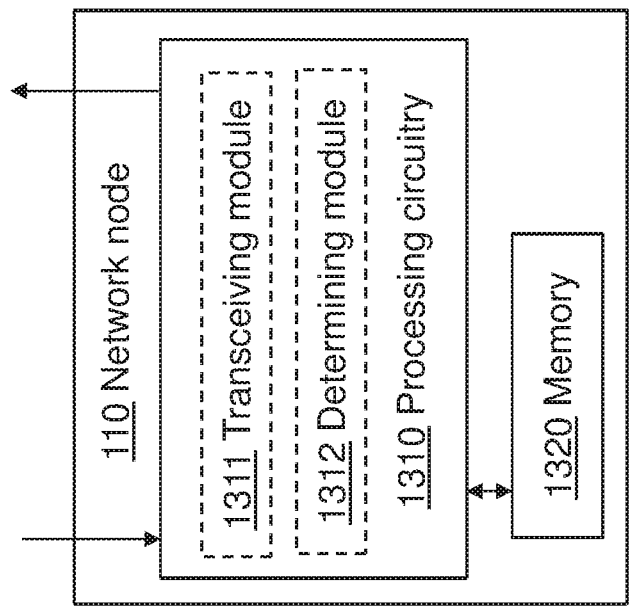
FIG. 13 is another block diagram depicting embodiments of a network node.

To perform the method actions in the network node 110 for handling communications in a radio communications network 100, the network node 110 may comprise the following arrangement depicted in FIG. 13. The network node 110 is configured to be in the radio communications network 100.

FIG. 13 shows a schematic block diagram of embodiments of the network node 110. In some embodiments, the network node 110 may comprise a transceiving module 1311 and a determining module 1312. In some embodiments, the network node 110 may comprise a processing circuitry 1310, which may also be referred to as processing module. The processing circuitry 1310 may comprise one or more of the transceiving module 1311 and the determining module 1312, and perform the function thereof as described below.

The network node 110 is configured to, or may comprise a transceiving module 1311 configured to, receive, from another network node, an RLF indication comprising a report of a RLF of a UE 121 which report comprises an identity of a re-establishment cell. The RLF indication further comprises a first indication of the cell identity of the cell the UE was connected to upon sending the RLF report and/or a second indication of a result of a comparison between the cell identity of the cell the UE was connected to upon sending the RLF report and the identity of the re-establishment cell. The network node 110 is also configured to, or may comprise a determining module 1311 configured to, determine, based on the first indication and/or the second indication, whether or not to consider the re-establishment cell indicated in the report of the RLF indication when performing adjustments relating to handover in a cell served by the network node 110.

In some embodiments, the network node 110 may be configured to, or may comprise a determining module 1312 configured to include the re-establishment cell when performing the adjustments relating to handover in a cell served by the network node 110 when the second indication indicates that the result of the comparison is a match. In some embodiments, the network node 110 may be configured to, or may comprise a determining module 1312 configured to, when the second indication indicates that the result of the comparison is not a match, determine whether or not to discard the identity of the re-establishment cell in the received report and exclude the re-establishment cell when performing the adjustments relating to handover in a cell served by the network node 110. In some embodiments, the network node 110 may be configured to, or may comprise a determining module 1312 configured to compare the identity of the re-establishment cell comprised in the received report with the first indication indicating the cell identity of the current cell the UE 121 is connected to. In some embodiments, the network node 110 may be configured to, or may comprise a determining module 1312 configured to, when the result of the comparison is a match, include the re-establishment cell when performing the adjustments relating to handover in a cell served by the network node 110. In some embodiments, the network node 110 may be configured to, or may comprise a determining module 1312 configured to, when the result of the comparison is not a match, determine whether or not to discard the identity of the re-establishment cell in the received report and exclude the re-establishment cell when performing the adjustments relating to handover in a cell served by the network node 110. In some embodiments, the network node 110 may be configured to, or may comprise a determining module 1312 configured to, when the result of the comparison is not a match and/or the second indication indicates that the result of the comparison is not a match, disregarding any previously received RLF indications relating to the same RLF or UE when performing the adjustments relating to handover in a cell served by the network node 110. In some embodiments, the network node 110 may be configured to, or may comprise a determining module 1312 configured to, when the first indication of the cell identity of the cell the UE was connected to upon sending the RLF report is set to a particular determined value, ignore the identity of the re-establishment cell in the received report and refrain from performing the adjustments relating to handover in a cell served by the network node 110 based on the first or second indication. In some embodiments, the adjustments relating to handover in a cell served by the network node 110 may comprise performing a Mobility Robustness Optimization, MRO, analysis and, based thereon, determine a trigger point for handover of UEs served by the network node 110.

The embodiments for handling communications in a radio communications network 100 may be implemented through one or more processors, such as, e.g. the processing circuitry 1310 in the network node 110 depicted in FIG. 13, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1310 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 110 may further comprise a memory 1320, which may be referred to or comprise one or more memory modules or units. The memory 1320 may be arranged to be used to store executable instructions and data to perform the methods described herein when being executed in the network node 110. Those skilled in the art will also appreciate that the processing circuitry 1310 and the memory 1320 described above may refer to a combination of analog and digital circuits, and/or one or more processors configured with software and/or firmware, e.g. stored in the memory 1320, that when executed by the one or more processors such as the processing circuitry 1310 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, a computer program, comprising instructions which, when executed on at least one processor, e.g. the processing circuitry or module 1310, cause the at least one processor to carry out the method for handling communications in a radio communications network 100 as described above is presented. Also, a carrier containing the computer program, wherein the carrier is one of an electronic signal, optical signal, radio signal, or computer readable storage medium, is presented.

The terminology used in the detailed description of the particular exemplary embodiments illustrated in the accompanying drawings is not intended to be limiting of the described methods and network nodes 110, 111, 112, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

3GPP 3rd Generation Partnership Project
CN Core Network
C-RNTI Cell Radio Network Temporary Identities
E-UTRAN Enhanced Universal Terrestrial Radio Access Network
eNB evolved Node B
GERAN GSM EDGE Radio Access Network
GSM Global System for Mobile Communications
HO Hand Over
HSPA High Speed Packet Access
IE Information Element
IRAT Inter-RAT
LTE Long Term Evolution
MRO Mobility Robustness Optimization
RAN Radio Access Network
RAT Radio Access Technology
RIM Radio Information Management
RLF Radio Link Failure
RNC Radio Network Controller
UE User Equipment
UMTS Universal Mobile Telecommunications System
UTRAN Universal Terrestrial Radio Access Network
WCDMA Wideband Code Division Multiple Access
X2AP X2 Application Protocol

What is claimed is:

1. A method performed by a network node for handling communications in a radio communications network, the method comprising:
   receiving a report of a radio link failure (RLF) of a user equipment (UE); and
   configuring an RLF indication that includes the RLF report and that further includes a first indication of a cell identity of the cell the UE was connected to upon sending the RLF report; and
   sending the RLF indication to another network node.

2. The method of claim 1, wherein the another network node is the network node serving the UE when the RLF occurred.

3. The method of claim 1, wherein the RLF indication is a X2AP RLF INDICATION message.

4. The method of claim 3, wherein the first indication is configured in a Re-establishment cell ECGI IE of the X2AP RLF INDICATION message.

5. The method of claim 1, wherein configuring the RLF indication comprises configuring the RLF indication to further comprise a second indication of a result of a comparison between the cell identity of the cell the UE was connected to upon sending the RLF report and an identity of a re-establishment cell included in the RLF report.

6. A method performed by a network node for handling communications in a radio communications network, the method comprising:
   receiving a report of a radio link failure (RLF) of a user equipment (UE); and
   configuring an RLF indication that includes an indication of a result of a comparison between a cell identity of the cell the UE was connected to upon sending the RLF report and an identity of a re-establishment cell included in the RLF report; and
   sending the RLF indication to another network node.

7. The method of claim 6, wherein configuring the RLF indication comprises configuring the RLF indication to further comprise an indication of the cell identity of the cell the UE was connected to upon sending the RLF report.

8. The method of claim 6, wherein the another network node is the network node serving the UE when the RLF occurred.

9. A method performed by a network node for handling communications in a radio communications network, the method comprising:
   receiving, from another network node, an RLF indication comprising a report of a radio link failure (RLF) of a user equipment (UE), said RLF indication further comprising a first indication of the cell identity of the cell the UE was connected to upon sending the RLF report; and
   determining, based on the first indication, whether to consider a re-establishment cell indicated in the report of the RLF indication when performing adjustments relating to handover in a cell served by the network node.

10. The method of claim 9, wherein the received indication further comprises a second indication of a result of a comparison between the cell identity of the cell the UE was connected to upon sending the RLF report and the identity of the re-establishment cell, and wherein the determining whether to consider the re-establishment cell indicated in the report of the RLF indication when performing adjustments relating to handover in a cell served by the network node is further based on the second indication.

11. The method of claim 10, wherein the determining further comprises, when the second indication indicates that the result of the comparison is a match, including the re-establishment cell when performing the adjustments relating to handover in a cell served by the network node.

12. The method of claim 10, wherein the determining further comprises, when the second indication indicates that the result of the comparison is not a match, determining whether to discard the identity of the re-establishment cell in the received report and exclude the re-establishment cell when performing the adjustments relating to handover in a cell served by the network node.

13. The method of claim 9, wherein the adjustments relating to handover in a cell served by the network node comprise performing a Mobility Robustness Optimization (MRO) analysis and determining a trigger point for handover of the cell served by the network node.

14. A method performed by a network node for handling communications in a radio communications network, the network node being configured to be in the radio communications network, the network node comprising;
   receiving, from another network node, an RLF indication comprising an indication of a result of a comparison between a cell identity of the cell the UE was connected to upon sending the RLF report and an identity of a re-establishment cell included in the RLF report; and determining, based on the indication, whether to consider the re-establishment cell indicated in the report of the RLF indication when performing adjustments relating to handover in a cell served by the network node.

15. The method of claim 14, wherein the received indication further comprises an indication of the cell identity of the cell the UE was connected to upon sending the RLF report, and wherein the determining whether to consider the re-establishment cell indicated in the report of the RLF indication when performing adjustments relating to handover in a cell served by the network node is further based on the indication of the cell identity of the cell the UE was connected to upon sending the RLF report.

* * * * *

UNITED STATES PATENT AND TRADEMARK OFFICE
CERTIFICATE OF CORRECTION

Page 1 of 2

PATENT NO. : 10,484,916 B2
APPLICATION NO. : 15/896829
DATED : November 19, 2019
INVENTOR(S) : Da Silva et al.

It is certified that error appears in the above-identified patent and that said Letters Patent is hereby corrected as shown below:

On the Title Page

Item (56), under "OTHER PUBLICATIONS", in Column 2, Line 4, delete "(Release 10)",3GPP" and insert -- (Release 10)", 3GPP --, therefor.

In the Specification

In Column 8, Line 58, delete "(WCDMA). Global" and insert -- (WCDMA), Global --, therefor.

In Columns 11 & 12, in Table 2, Line 1, delete "Criticslity" and insert -- Criticality --, therefor.

In Columns 13 & 14, in Table 2, Line 1, delete "Criticslity" and insert -- Criticality --, therefor.

In Columns 13 & 14, in Table 2, under "Semantics description", Line 13, delete "Incoming" and insert -- incoming --, therefor.

In Columns 13 & 14, in Table 3, Line 3, delete "RSRP-Range" and insert -- RSRP-Range, --, therefor.

In Columns 13 & 14, in Table 3, Line 7, delete "measResultEUTRA-r9" and insert -- measResultListEUTRA-r9 --, therefor.

In Columns 13 & 14, in Table 3, Line 9, delete "OPTTONAL," and insert -- OPTIONAL, --, therefor.

In Columns 13 & 14, in Table 3, Line 10, delete "OPTIONAL" and insert -- OPTIONAL, --, therefor.

In Columns 13 & 14, in Table 3, Line 14, delete "failedPCellID-r10" and insert -- failedPCellId-r10 --, therefor.

In Columns 13 & 14, in Table 3, Line 16, delete "pci-artcn-r10" and insert -- pci-arfcn-r10 --, therefor.
In Columns 13 & 14, in Table 3, Line 26, delete "falledPCellID-v1090" and insert Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,484,916 B2

-- failedPCellId-v1090 --, therefor.

In Columns 13 & 14, in Table 3, Line 27, delete "ARFCN-valueEUTRA-v9e0" and insert -- ARFCN-ValueEUTRA-v9e0 --, therefor.

In Column 16, Line 57, delete "Operation and Maintenance," and insert -- Operation, Administration and Maintenance, --, therefor.

In Column 17, Lines 37-38, delete "Operation and Maintenance," and insert -- Operation, Administration and Maintenance, --, therefor.

In Column 18, Line 65, delete "the served" and insert -- the cell served --, therefor.

In Column 21, Line 39, delete "TS36.423 v 1.5.0" and insert -- TS36.423 v11.5.0 --, therefor.

In Column 23, Line 6, delete "determining module 1311" and insert -- determining module 1312 --, therefor.

In the Claims

In Column 26, Line 7, in Claim 6, delete "(UE); and" and insert -- (UE); --, therefor.

In Column 26, Line 64, in Claim 14, delete "comprising;" and insert -- comprising: --, therefor.